Aug. 17, 1965 L. P. BUNGE 3,200,545
FOLDING TRAILER
Filed Oct. 17, 1961 7 Sheets-Sheet 2
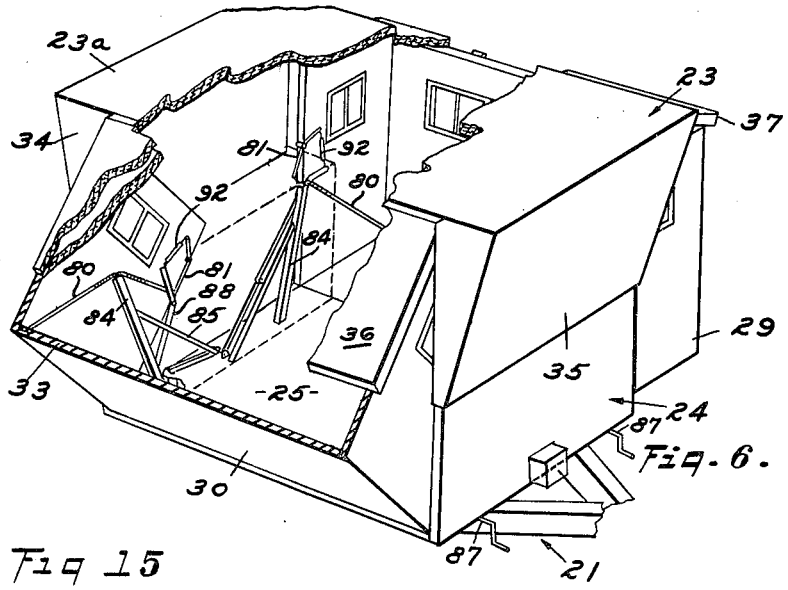
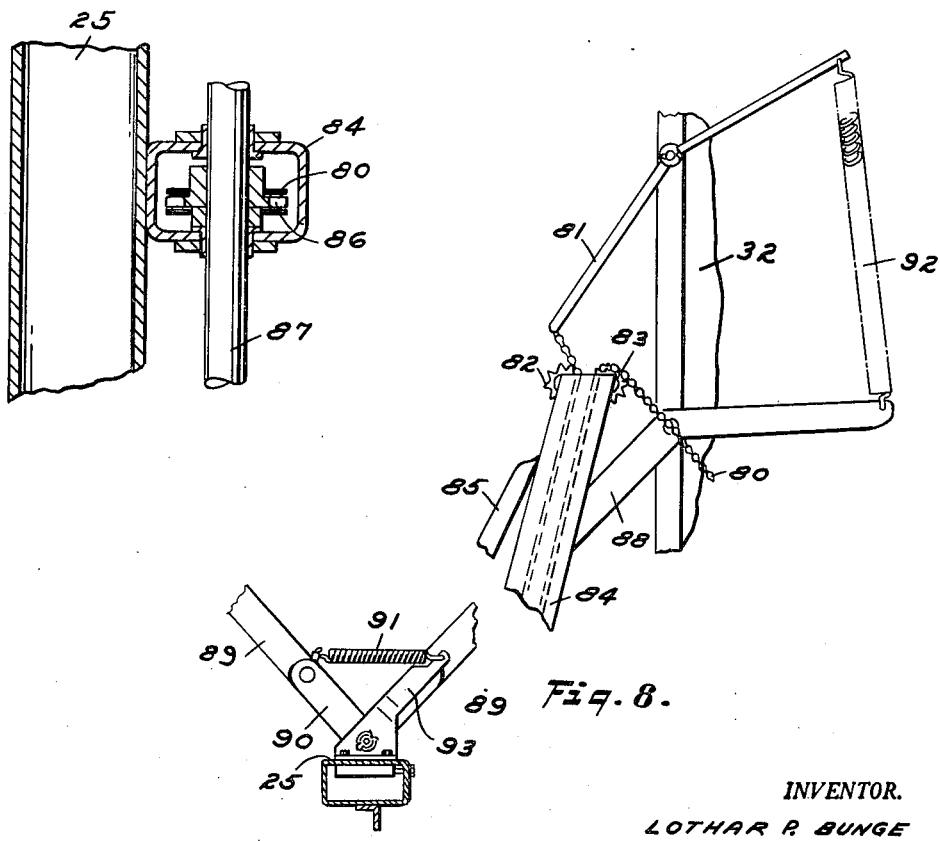
INVENTOR.
LOTHAR P. BUNGE
BY
Barnes, Kisselle, Raisch & Choate
ATTORNEYS

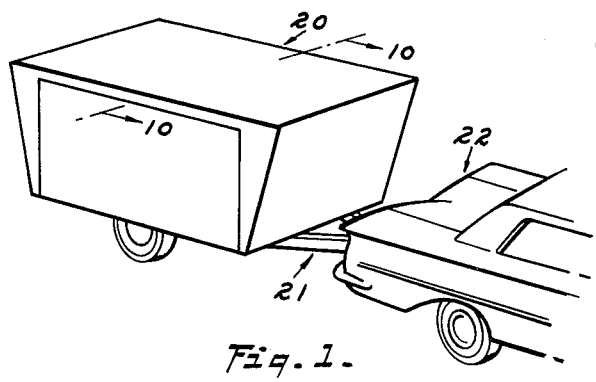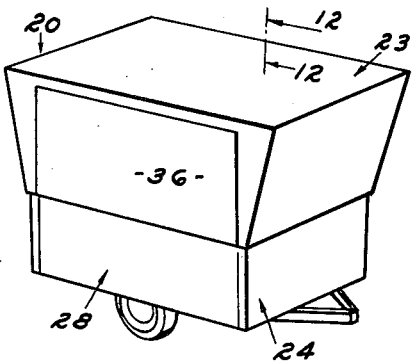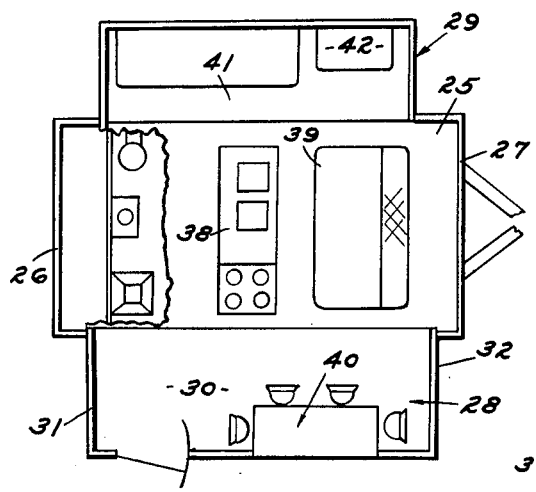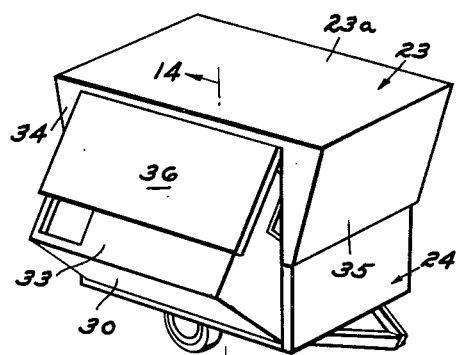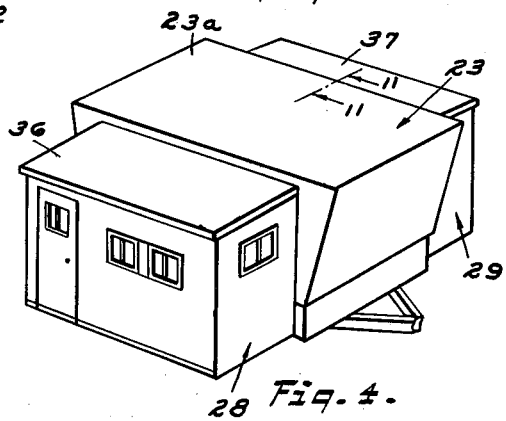

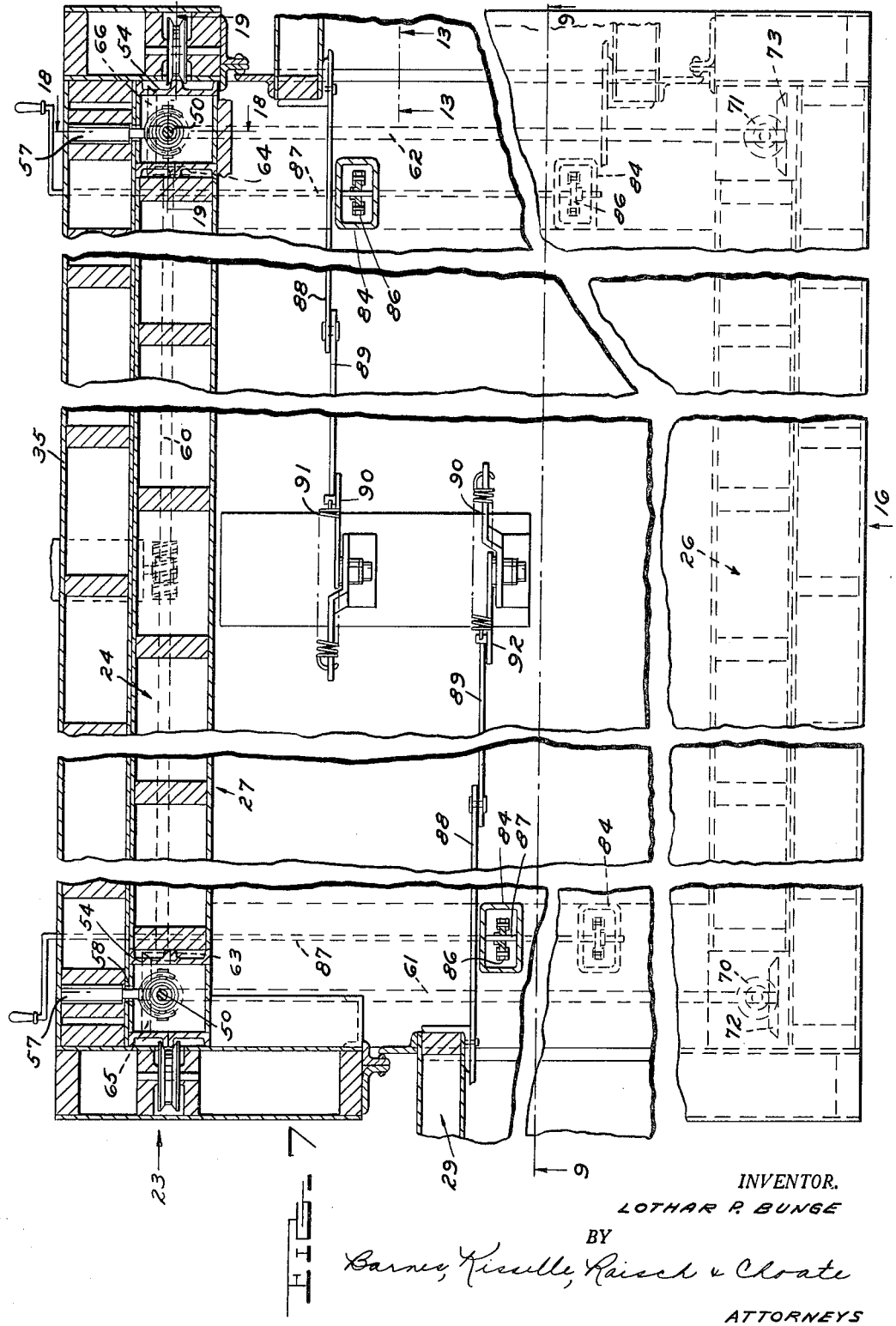

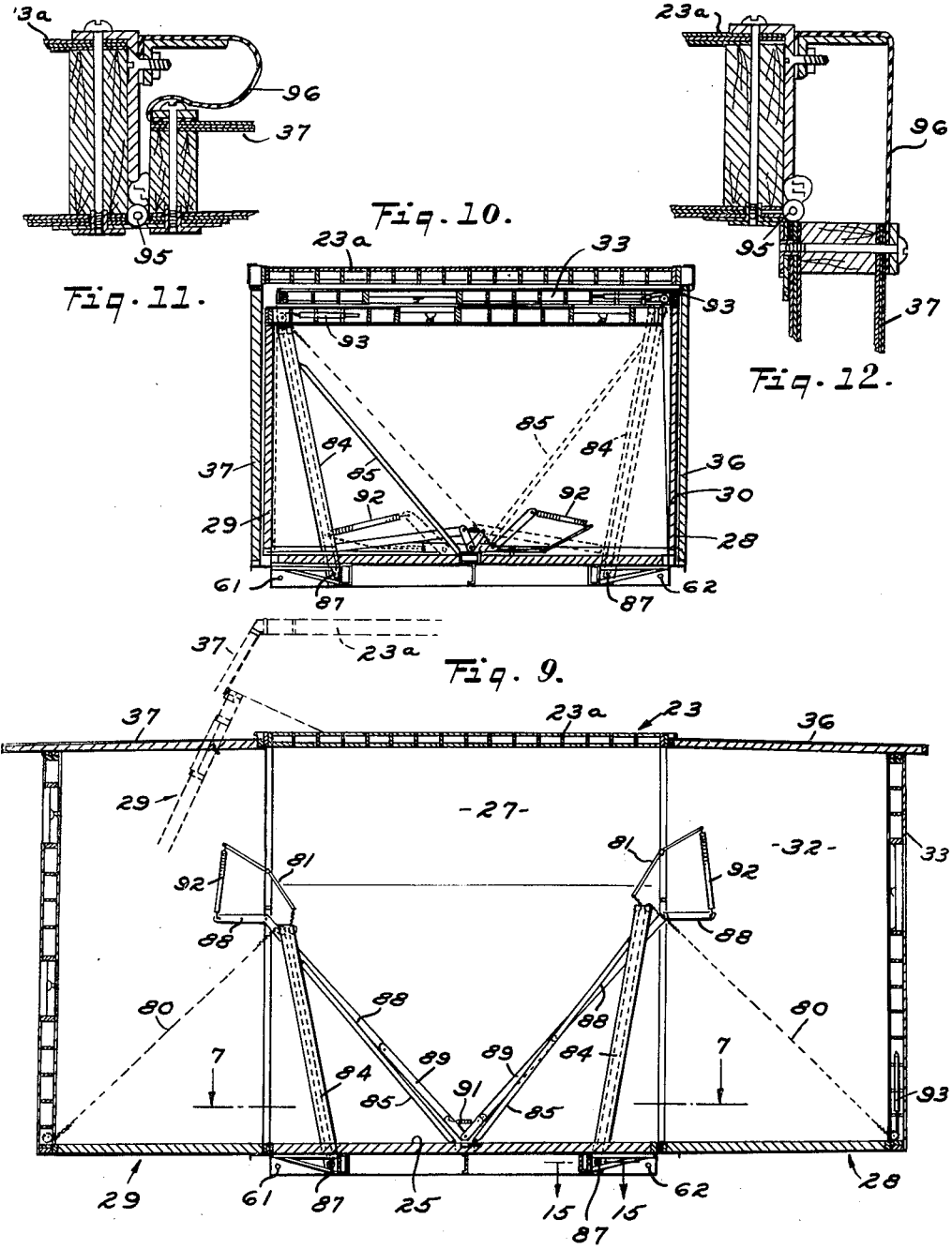

Aug. 17, 1965 L. P. BUNGE 3,200,545
FOLDING TRAILER
Filed Oct. 17, 1961 7 Sheets-Sheet 5

INVENTOR.
LOTHAR P. BUNGE
BY
Barnes, Kisselle, Raisch & Choate
ATTORNEYS

Aug. 17, 1965  L. P. BUNGE  3,200,545
FOLDING TRAILER
Filed Oct. 17, 1961  7 Sheets-Sheet 6
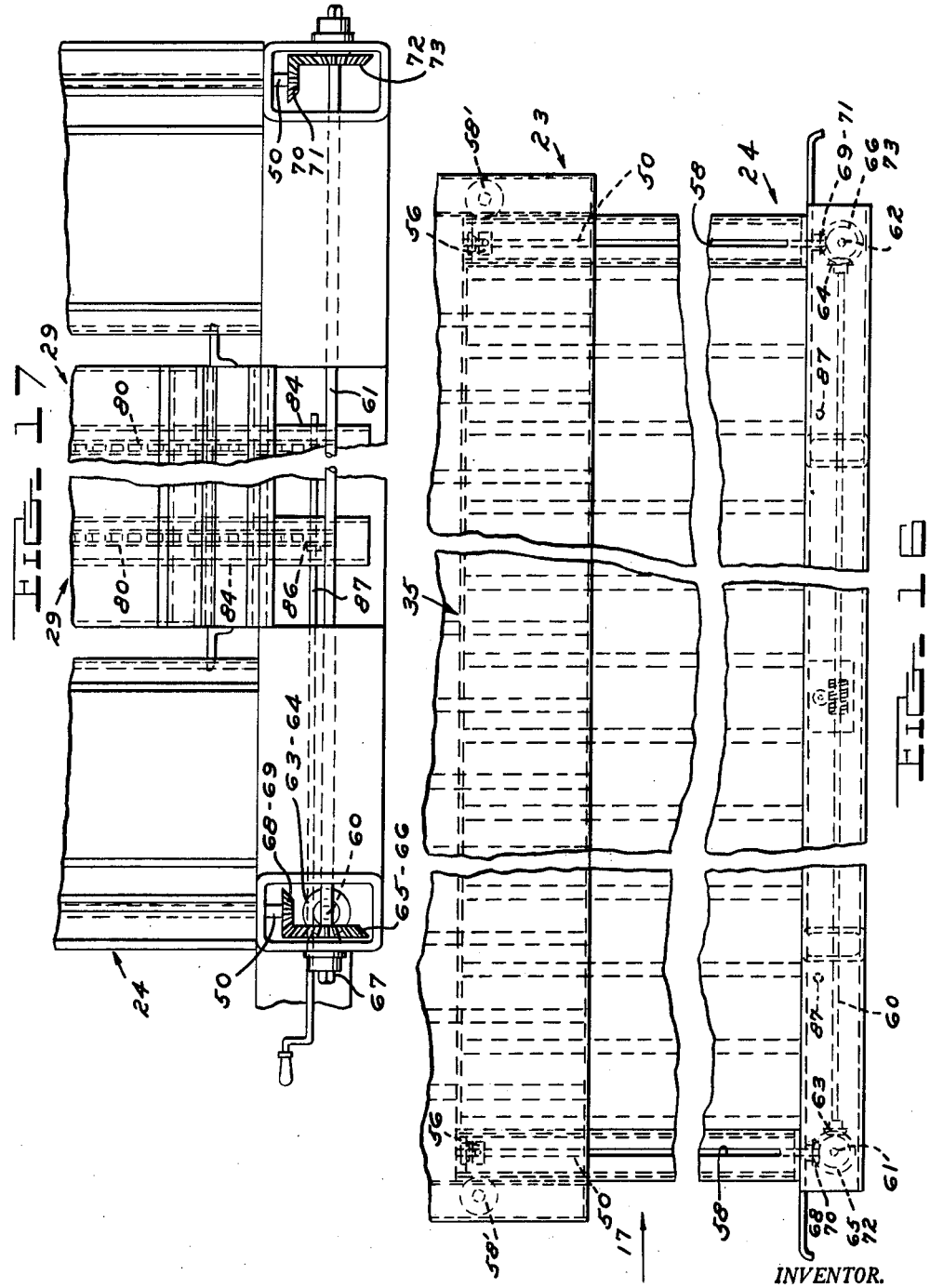
INVENTOR.
LOTHAR P. BUNGE
BY
Barnes, Kisselle, Raisch & Choate
ATTORNEYS

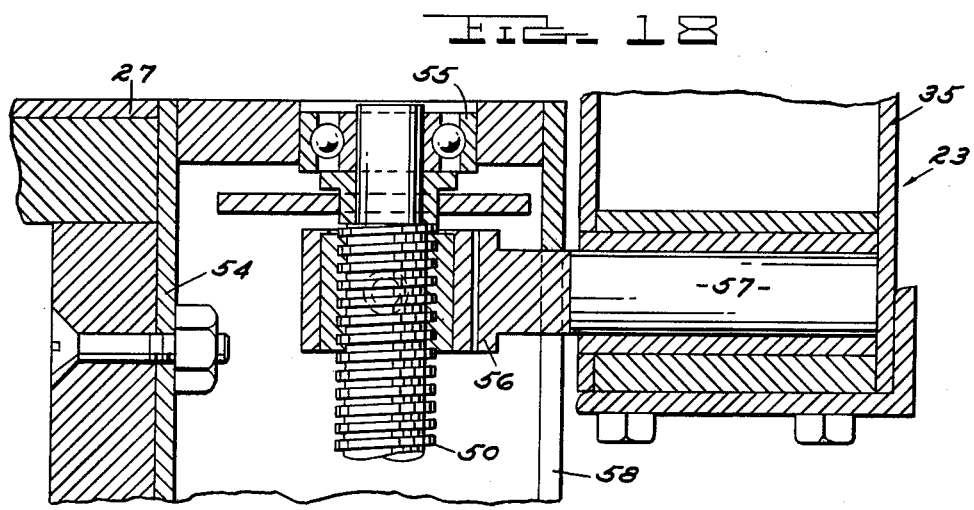
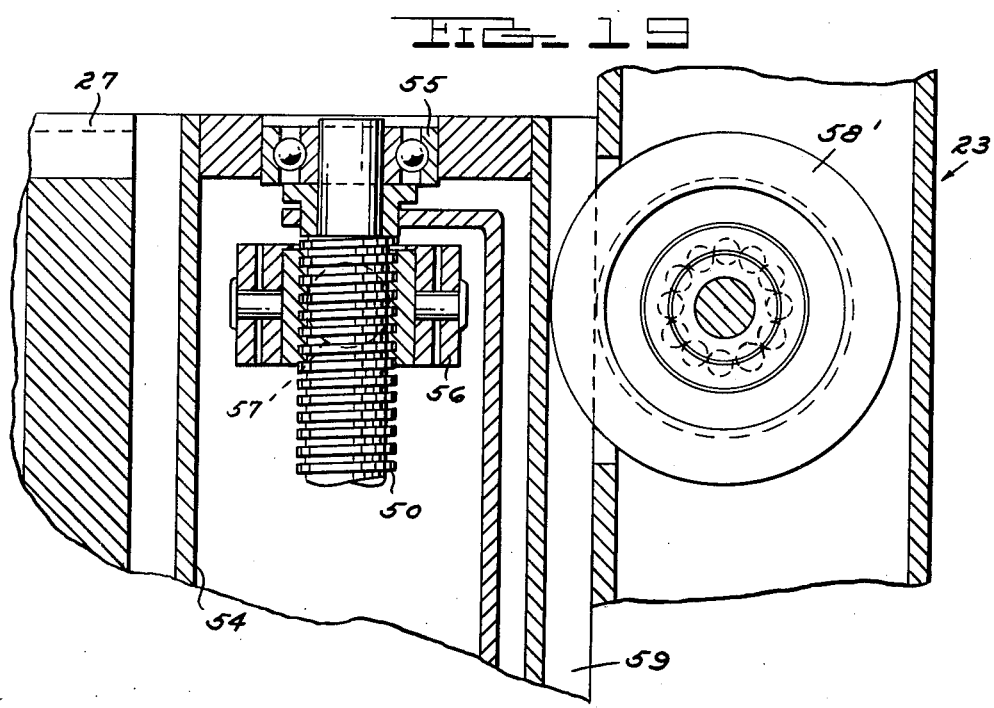

United States Patent Office 3,200,545
Patented Aug. 17, 1965

3,200,545
FOLDING TRAILER
Lothar P. Bunge, Berkley, Mich.
(1528 E. 11 Mile Road, Warren, Mich.)
Filed Oct. 17, 1961, Ser. No. 145,702
4 Claims. (Cl. 52—66)

This invention relates to folding trailers particularly of the type which can be expanded to provide sleeping and living quarters.

In recent years, it has become very popular to provide trailers of various types which can be towed behind an automobile and expanded by the use of flexible walls and the like to provide a living and sleeping area.

It is an object of this invention to provide a compact trailer which has a low silhouette and small cornering radius when in folded condition and which provides ample living and sleeping areas when expanded or unfolded.

It is a further object of the invention to provide such a trailer which can be folded and expanded without the use of tools.

It is a further object of the invention to provide such a trailer which is weather tight.

It is a further object of the invention to provide such a trailer wherein a minimum arrangement and rearrangement of the interior furnishings must be done to expand or fold the trailer.

It is a further object of the invention to provide such a trailer utilizing a novel linkage for moving the folding sections thereof.

Basically, the trailer comprises an upper section and a lower section. The upper section is movable upwardly and downwardly relative to the lower section to fold or expand the trailer. The lower section includes side units which are hinged to the bottom wall of the lower section and may be swung inwardly into telescoping relation or outwardly to unfolded or expanded condition. The top section also includes panels which are hinged along the side edges thereof and form extensions of the top wall over the side units when the side units are unfolded. As presently described, novel means are provided for extending and retracting the various parts of the trailer.

In the drawings:

FIG. 1 is a fragmentary perspective view of an automobile towing the trailer embodying the invention.

FIGS. 2 and 3 are perspective views showing successive steps in unfolding or expanding the trailer.

FIG. 4 is a perspective view showing the trailer in expanded condition.

FIG. 5 is a top plan view of the trailer shown in FIG. 4, parts being broken away.

FIG. 6 is a perspective view similar to FIG. 3, parts being broken away.

FIG. 7 is a fragmentary sectional plan view taken along the line 7—7 in FIG. 9.

FIG. 8 is a fragmentary side elevation of a portion of the expanding and folding mechanism.

FIG. 9 is a sectional view taken along the line 9—9 in FIG. 7.

FIG. 10 is a sectional view similar to FIG. 9 showing the parts in folded condition.

FIG. 11 is a fragmentary sectional view taken along the line 11—11 in FIG. 4.

FIG. 12 is a fragmentary sectional view taken along the line 12—12 in FIG. 2.

FIG. 15 is a fragmentary sectional view taken along the line 15—15 in FIG. 9.

FIG. 16 is a fragmentary sectional view of a portion of the apparatus shown in FIG. 7.

FIG. 17 is a fragmentary view taken in the direction of the arrow 17 in FIG. 16.

FIG. 18 is a fragmentary sectional view taken along the line 18—18 in FIG. 7.

FIG. 19 is a fragmentary sectional view taken along the line 19—19 in FIG. 7.

Figure 14:
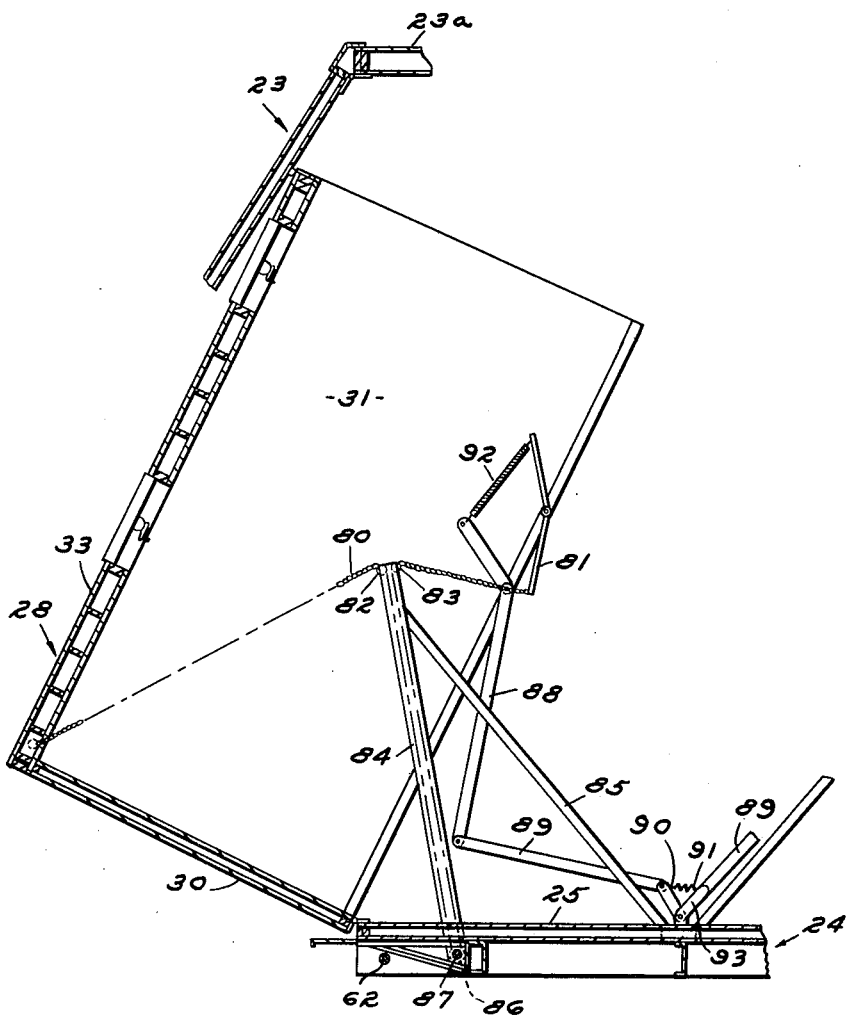
FIG. 14 is a fragmentary sectional view taken along the line 14—14 in FIG. 3.

Referring to FIG. 1, the folding trailer 20 embodying the invention is supported on a wheeled frame 21 that is adapted to be towed behind an automobile 22.

Basically, the trailer 20 comprises an upper section 23 which is adapted to be moved upwardly and downwardly relative to a lower section 24. The lower section 24 comprises a bottom wall 25, end walls 26, 27. In addition, side units 28, 29 are hinged to the longitudinal edges of the side walls 25 for swinging movement from a position in which they are telescoped inwardly relative to one another to a position where they are expanded outwardly. Each side unit 28, 29 is of substantially similar construction except that one is smaller than the other so that it can be telescoped within the other. As shown in FIGS. 3, 4 and 5, side unit 28 comprises a first wall 30 that forms an extension of the bottom wall 25 when the unit 28 is swung outwardly, opposed end walls 31, 32 that, in effect, form extensions of the end walls 26, 27, respectively, and a side wall 33 that forms the side wall of the trailer when the trailer is expanded.

Upper section 23 of the trailer comprises a top wall 23a and ends walls 34, 35 that slidingly overlap the end walls 26, 27 of the lower section 24. In addition, panels 36, 37 are hinged along the longitudinal edges of the top wall 23a of upper section 23 so that they can swing outwardly to permit the inward and outward movement of the side units 28, 29 and also to form extensions of the top wall 23a when the trailer is in extended condition.

In order to unfold or expand the trailer from the traveling position shown in FIG. 1 to the living and sleeping position shown in FIG. 4, the upper section 23 is first elevated, by apparatus presently described, and then each side unit 28, 29 is swung outwardly, in succession, by apparatus presently described. The upper section 23 is then lowered so that the side panels 36, 37 form top walls for the side units 28, 29.

In order to fold the trailer, the reverse procedure is followed: the upper section 23 is first elevated, the side unit 29 then is swung inwardly, the side unit 28 is then swung inwardly, and finally the upper section 23 is telescoping over side unit 29 and lowered so that the trailer is in the folded condition shown in FIG. 1.

In the expanded or folded position, as shown in FIG. 15, the trailer can support various items such as a work counter 38, bed 39 and the like in substantially fixed unobstructed relation on the bottom wall 25. Additional furniture 40 can be placed on the bottom wall 25 so that it is out of position when the trailer is in folded condition but can be moved onto the unit 28 as desired when the trailer is expanded. Since side unit 28 telescopes over side unit 29, additional items of furniture 41, 42 can be built into the side unit 29 as desired and permanently fixed thereto so that they will move with the side unit 29.

Referring to FIG. 6, the mechanism for elevating the upper section 23 relative to the lower section 24 comprises a plurality of vertical screws 50 (FIG. 7) that are journalled on the lower section 24 and nuts that are fastened to the upper section 23. The screws 50 are rotated simultaneously, as presently described, to raise and lower the upper section 23.

Referring to FIGS. 7, 18 and 19, the end walls 27, 26 include upright hollow frame members 54 at the corners thereof. A screw 50 is journalled within each frame member 53, 54 by ball bearings 55 at the upper and lower ends thereof. As shown in FIG. 18, each screw has a nut 56 threaded thereon. Each nut 56 includes a portion 57 that extends through a slot 58 in its members 53, 54 and is fixed to the end wall 35, or 34 as the case may be of the upper section 23. If the screws 50 are simultaneously rotated, then the section 23 is raised and lowered. As shown in FIGS. 7 and 16, guide rollers 58' rotatably mounted in the upper section 23 engage ribs 59 on the exterior surface of the members 54 to guide the up and down movement of the upper section 23 relative to the lower section 24.

The mechanism for simultaneously rotating screws 50 comprises a transverse rod 60 at the front end of the trailer journalled for rotation about its axis and longitudinally extending horizontal rods 61, 62 along the side edges of the trailer journalled on the base section for rotation about their axes. As shown in FIGS. 16 and 17, rod 60 is interconnected to rod 61 by bevel gears 63, 65 at one end and to rod 62 by bevel gears 64, 66 at the other end. In this fashion, if one of the rods 60, 61, 62 is rotated, the other two are also rotated. Rotation is adapted to be performed by the engagement of a crank with a projection 67 on the end of rod 60. As shown in FIG. 16, bevel gears 68, 69 on the lower ends of the screws 50 engage the bevel gears 65, 66, respectively, to drive the screws 50 at the front end of the trailer. In a similar fashion, bevel gears 70, 71 on the lower ends of the screws 50 at the rear of the trailer engage bevel gears 72, 73, respectively, on the rods 61, 62 so that the screws 50 at the rear of the trailer are also simultaneously rotated (FIG. 7).

The apparatus for swinging the units 28, 29 inwardly and outwardly is identical. Each such apparatus comprises a flexible element 80, preferably a chain, at each end of a unit (FIG. 9). As shown in FIG. 14, one end of chain 80 is fastened to the unit 28 adjacent the corner of wall 33 and wall 30. The other end of the chain 80 is connected to one end of a lever 81 that is pivoted to the side unit along the inner edge of end wall 31. Chain 80 travels over idler sprockets 82, 83 and a drive sprocket 86 fixed to a shaft 87. Idler sprockets 82, 83 are journalled in the opposite ends of a tube 84 which is fixed on the bottom wall 25 of lower section 24 so that it extends upwardly and outwardly, being held in position by a brace 85. The chain 80 passes over idler sprocket 82 down within the tube 84, over sprocket 86 on a shaft 87 and back up over idler sprocket 83 to the lower end of the lever 81.

A collapsible arm comprising links 88, 89 is provided. Link 89 is connected at one end to a short bar 90 pivoted to bottom wall 25 and at its other end to the link 88. A spring 91 extends between bar 90 and a bracket 93 on bottom wall 25 (FIGS. 7 and 8). The link 88 is, in turn, pivoted intermediate its ends to the end wall 31. The other end of link 88 is connected to the other end of lever 81 by a coil tension spring 92 (FIG. 8). By rotating the sprocket 86 on shaft 87 the chain 80 is caused to be pulled in one direction or another causing the unit 28 to swing inwardly or outwardly. Thus, as shown in FIG. 8, if the chain 80 is pulled in such a manner as to shorten the portion thereof extending to the unit 28 or 29 (FIG. 9) the unit is caused to swing inwardly. If the chain is caused to be pulled in the opposite direction tending to lengthen the portion thereof extending from the tube 84 to the unit 28, 29, the unit 28, 29, as the case may be, is permitted to swing outwardly. The yieldable element 92 provides for the collapse of the link 89 or the extension thereof depending upon the direction of drive. A similar arrangement is provided at each end of each unit 28, 29 and is fastened to the same shaft 87 as the sprocket of the mechanism at the other end.

As shown in FIG. 9, the end of the chain 80 that is connected to the corner of the unit 28, 29 preferably is yieldingly connected through means of a spring loaded plunger 93.

Figure 13:
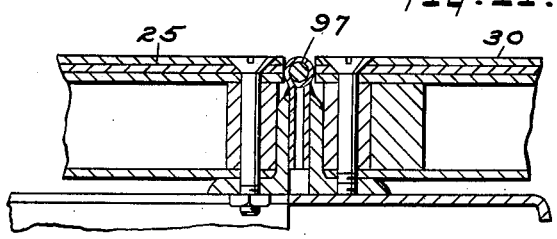
FIG. 13 is a fragmentary sectional view taken along the line 13—13 in FIG. 7.

The hinge construction for the panel 36, 37 is shown in FIGS. 11 and 12 and comprises a hinge 95 and a sealing strip 96 that overlies the hinge and provides a weathertight seal. The hinge for the units 28, 29 to the bottom wall 25 is shown in FIG. 13 and comprises a flat hinge 97.

The various walls of the units can be made of a suitable insulating material such as laminated plywood, cellular laminated material or the like. Light-weight materials are, of course, preferred.

I claim:

1. In a folding trailer, the combination comprising a lower section having a base wall and end walls on said base wall, an upper section having a top wall and end walls telescoping over the end walls of the lower section, means for raising and lowering said upper section relative to said lower section, and a pair of side units hinged to said base wall of said lower section along opposite sides intermediate the end walls thereof and movable from a position between said end walls to an unfolded position outwardly thereof, each said unit comprising a first wall defining an extension of the base wall of the lower section when the unit is in said unfolded position, a section wall normal to said first wall and defining a side wall of the trailer when the unit is in unfolded position, and opposed end walls normal to said first and second walls and defining extensions of the end walls of the upper and lower section when the unit is in unfolded position, means individual to each said unit for swinging each of said units to said unfolded position, said side units being so dimensioned that one unit telescopes within the other when they are swung inwardly, said upper section including a pair of panels hinged along opposite sides of said top wall intermediate the end walls thereof and adapted to form side walls when the trailer is in folded condition and top walls over the units when the trailer is in unfolded condition, each said means for swinging one of said units comprising a pair of links pivoted to one another at one end, one of said links being pivoted to the lower section and the other of said links being pivoted to its respective unit, a flexible element individual to each said unit and having the end thereof connected to said respective unit, and a rotary element drivingly engaged with said flexible element and being journalled in said lower section whereby rotation of said rotary element causes said flexible element to be driven in one direction or another to swing the unit inwardly or outwardly, each said means for swinging said unit including a lever pivoted to said unit, one end of said flexible element being connected to one end of said lever, and a tension element connected to the other end of said lever and one of said links which is pivoted to said lower section.

2. The combination set forth in claim 1 including a pair of idlers on opposed sides of said rotary element engaging said flexible element.

3. The combination set forth in claim 2 including a tubular guide surrounding said flexible element between said idlers and said rotary element.

4. In a folding trailer, the combination comprising a lower section comprising a base wall and end walls on said base wall, an upper section comprising a top wall and end walls adapted to telescope over the end walls of the lower section, means for raising and lowering said upper section relative to said lower section, a pair of side units hinged to said base wall of said lower section along opposite longitudinal axes for movement inwardly and outwardly relative to said lower section, each said unit comprising a first wall defining an extension of the base wall of the lower section when the unit is in expanded position, a section wall defining a side wall of the trailer when the unit is in expanded position, and opposed end walls defining extensions of the end wall of the upper and lower section when the unit is in expanded position, means for swinging each of said units inwardly and outwardly relative to one another, said units being so dimensioned that one unit telescopes within the other when they are swung inwardly, said upper section including a pair of panels hinged along longitudinal axes and adapted to form side walls when the trailer is in folded condition and top walls over the units when the trailer is in expanded condition, each said means for swinging a unit comprising a pair of links pivoted to one another at one end, one of said links being pivoted to the lower section and the other of said links being pivoted to its respective unit, a flexible element individual to each said unit and having one end thereof connected to said respective unit at a point remote from said longitudinal axis and said other link, a lever pivoted to said lower section, the other end of said flexible element being connected to one end of said lever, and a tension element connected to the other end of said lever and one of said links which is pivoted to said lower section, a rotary element drivingly engaged with said flexible element and being journalled in said lower section whereby rotation of said rotary element causes said flexible element to be driven in one direction or another to swing the unit inwardly or outwardly, a pair of idlers on opposed sides of said rotary element engaging said flexible element, and a tubular guide surrounding said flexible element between said idlers and said rotary element.

References Cited by the Examiner

UNITED STATES PATENTS

| | | | |
|---|---|---|---|
| 559,962 | 5/96 | Bierstadt | 296—23 X |
| 1,124,212 | 1/15 | Cromley | 296—23 |
| 1,864,047 | 6/32 | Lawhorne | 296—23 |
| 1,972,415 | 9/34 | Anderson | 296—26 |
| 2,193,352 | 3/40 | Thomas | 296—23 |
| 3,062,579 | 11/62 | Smith | 296—23 |

FOREIGN PATENTS

| | | |
|---|---|---|
| 1,052,397 | 9/53 | France. |
| 1,139,741 | 2/57 | France. |

JACOB L. NACKENOFF, *Primary Examiner.*

PHILIP ARNOLD, EARL J. WITMER, *Examiners.*